United States Patent [19]
Loiseaux et al.

[11] Patent Number: 5,416,617
[45] Date of Patent: May 16, 1995

[54] IMAGE PROJECTION DISPLAY SCREEN EMPLOYING POLYMER DISPERSED LIQUID CRYSTAL LAYER AND ELECTROCHROMIC LAYER

[75] Inventors: Brigitte Loiseaux, Villebon Sur Yvette; Philippe Robin; Andréas Oppenlander, both of Bourg La Reine; Jean-Pierre Huignard, Paris, all of France

[73] Assignee: Thomson-CSF, Puteax, France

[21] Appl. No.: 94,042

[22] PCT Filed: Nov. 20, 1992

[86] PCT No.: PCT/FR92/01078

§ 371 Date: Jul. 16, 1993

§ 102(e) Date: Jul. 16, 1993

[87] PCT Pub. No.: WO93/10481

PCT Pub. Date: May 27, 1993

[30] Foreign Application Priority Data

Nov. 22, 1991 [FR] France ................... 91 14403

[51] Int. Cl.$^6$ ............ G02F 1/13; G02F 1/15; G03B 21/60
[52] U.S. Cl. .................. 359/51; 359/452; 359/449; 359/443; 359/265; 359/267
[58] Field of Search .......... 359/52, 51, 38, 69, 359/70, 96, 443, 265, 267, 268, 275, 452, 449

[56] References Cited

U.S. PATENT DOCUMENTS

| | | | |
|---|---|---|---|
| 4,671,617 | 6/1987 | Hara | 359/267 |
| 5,009,044 | 4/1991 | Baughman et al. | 359/51 |
| 5,175,637 | 12/1992 | Jones et al. | 359/51 |
| 5,193,015 | 3/1993 | Shanks | 359/443 |
| 5,301,046 | 4/1994 | Konuma et al. | 359/52 |

FOREIGN PATENT DOCUMENTS

| | | |
|---|---|---|
| 2549627 | 1/1985 | France . |
| 59-191017 | 10/1984 | Japan . |
| 60-165632 | 8/1985 | Japan . |
| 62-150324 | 7/1987 | Japan . |
| 63-247721 | 10/1988 | Japan . |
| 02120828 | 5/1990 | Japan . |

*Primary Examiner*—William L. Sikes
*Assistant Examiner*—Kenneth Parker
*Attorney, Agent, or Firm*—Meltzer, Lippe, Goldstein

[57] ABSTRACT

A diffusing display screen resulting from the combination of a cell comprising a polymer dispersed liquid crystal material which can be made diffusing, and of a cell comprising an electrochromic material which can be made absorbing and reflecting. Outside the operating mode, the display screen according to the invention has the advantage of being transparent, and thus capable of being fixed onto any surface (window, wall, etc.).

3 Claims, 2 Drawing Sheets

IMAGE PROJECTION DISPLAY SCREEN EMPLOYING POLYMER DISPERSED LIQUID CRYSTAL LAYER AND ELECTROCHROMIC LAYER

The invention relates to a diffusing display screen, and more particularly an image projection display screen which can be used in particular in the field of high-definition television.

In fact, in this field, it is currently sought to obtain images whose dimensions are of the order of one square meter, it being possible to satisfy such a constraint by resorting to projection devices comprising cathode ray tubes or liquid crystal matrices in which the observer and the images are on the same side of the display screen.

FIG. 1 illustrates one embodiment of this type of image projector, in which the display screen constitutes an element which independent of the projector, which makes it possible to display an image whose size may be variable. It is composed of a collimated light source, of reflecting mirrors $M_R$ and of dichroic mirrors Md capable of reflecting selectively red, green and blue, as well as lenses (L) coupled with liquid crystal matrices (CL) making it possible to modulate the red, green or blue light intensities. The colour light beams are recombined, then sent to a projection objective (OP) capable of projecting the image thus constituted onto a display screen, the observer being situated between the projector and the display screen, and receiving the images reflected from the display screen. Since the display screen is not integrated with the projector, it is therefore necessary for the user to be equipped with a projector and with an independent display screen. However, the use of a display screen requires either that it be stored and be brought out solely when it is to be used, or that sufficient free space be made available to keep his display screen permanently in operating mode. In order to overcome this problem, the invention provides a device which allows the use of any transparent or non-transparent surface (window or wall) as the diffusing display screen.

For this purpose, a display screen according to the invention is placed on the surface of non-specific nature, which screen is capable of being transparent outside operating mode (allowing light to pass in the case of a window, or the wall decoration, in the case of a wall), and becoming reflecting (an advantage over conventional diffusing display screens) and diffusing like conventional display screens, in operating mode. When this type of display screen according to the invention is fixed to a window, it can advantageously be used as a shutter making it possible to isolate a subject from the outside without thereby creating a darkened zone, since the background light can be backscattered from the window which has become diffusing. The invention thus provides a diffusing display screen characterised in that it is obtained from the combination:

of a cell ($C_1$) comprising a polymer film (P) of optical index np, in which are dispersed microballs laid out parallel to the plane of the film, these microballs containing oblong and birefringent liquid crystal molecules of extraordinary index $n_e$ such that $n_e$ is equal to $n_p$;

and a cell ($C_2$) comprising a layer of electrochromic material ($E_c$), both the cells ($C_1$) and ($C_2$) being fixed onto a surface (S).

As shown by FIGS. 2a (transparent state) and FIGS. 2b (diffusing state), it is possible with this type of material to obtain the two desired states. In fact, it is possible to manufacture polymer films in which are dispersed balls of liquid crystal. FIG. 2a illustrates a film of polymer with dispersed liquid crystal (PDLC) at rest. The balls dispersed in the polymer may contain particles of liquid crystal, a nematic is preferably chosen which has oblong particles which are oriented parallel to a priviledged axis (diagrammatically represented in FIG. 2a by the direction x). The ellipsoid of the indices of such molecules does not have symmetry of revolution, and two optical indices are conventionally defined, the ordinary optical index $n_o$ in a direction perpendicular to the long axis of the molecule, and the extraordinary index $n_e$ in a parallel direction. The manufacture of the films conventionally generates microballs laid-out parallel to the plane of the film, in which the nematic molecules are constrained to be oriented parallel to the long axis of these microballs. Thus, when a light ray arrives at an incidence with direction k perpendicular to the plane of the film (PDLC), it is influenced by the extraordinary optical index $n_e$ (corresponding to the optical axis parallel to the direction x); this index may have been expediently chosen to be equal to the optical index of the binding polymer $n_p$, and therefore to the state 11, the medium appears homogeneous, and may therefore be transparent to the incident light. FIG. 2b illustrates the behaviour of the nematic molecules when the film is subjected to an electric field, preferably an alternating electric field, applied in a direction y perpendicular to the plane of the film. The nematic molecules are constrained and are oriented along this direction y, the dominant optical index in this case is the ordinary index $n_o$ which is different from the mean optical index of the polymer $n_p$, there are thus small domains of different optical index creating defects which generate non-homogeneous zones in the film, and which lead to the existence of a diffusing and backscattering state 12 (the diffusion occurring in the direction of propagation of the light, and the backscattering occurring in the opposite direction).

Preferably, the material ($M_2$) is an electrochromic material whose absorption can be controlled electrically, and which is thus capable of passing from a transparent state 21 to a partially absorbing and partially reflecting state 22. When the material ($M_1$) is in its diffusing state 12, it is advantageous to interpose between this material and the surface (S) the material ($M_2$) in its state 22, so as to compensate for the partial transmission of the cell ($C_1$), which, although diffusing and backscattering, still transmits some of the light coming from outside, in the case of a window, or of wall elements, in the case of a wall. This parasitic light disturbs the diffusing display screen, and the contrast of the images seen by an observer, when the screen is used in an image projection device. The advantage of the cell ($C_2$) is twofold, since the material ($M_2$) in its state 22 is also partially reflecting, and can thus generate backscattering of the light transmitted by the cell ($C_1$), consequently increasing the total backscattering, and therefore the luminosity of the screen.

The two cells ($C_1$) and ($C_2$) used in the invention preferably comprise transparent electrodes allowing the voltages necessary for the various changes of state to be applied.

The display screen according to the invention can be used as a display screen for image projection, when it is associated with an image projection device comprising a light source provided a cathode ray tube or a set of crystal matrices illuminated by a lamp.

The invention will be better understood, and other advantages will emerge, on reading the description which is given non-limitingly, and the attached drawings, amongst which:

FIG. 1 illustrates an example of an image projection device associated with a projection display screen according to the known art;

FIG. 2 diagrammatically represents the operation of a polymer film containing dispersed liquid crystal;

Figure 1:
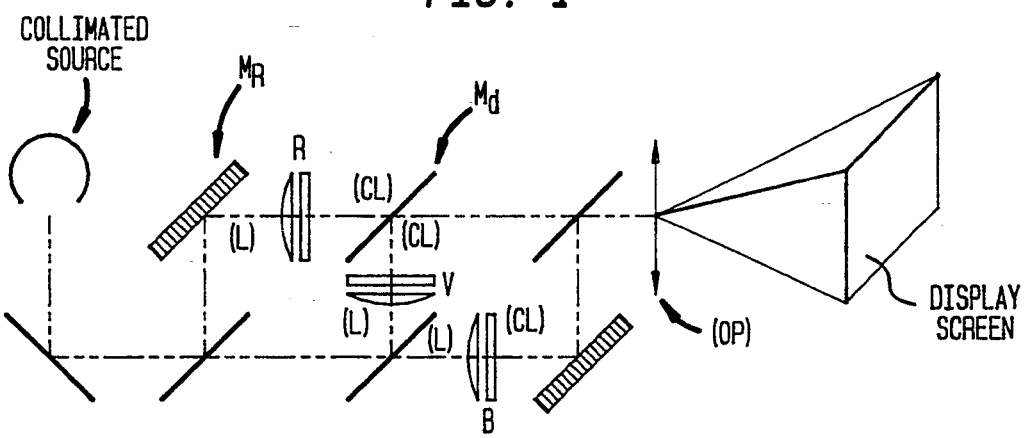
Figure 2A:
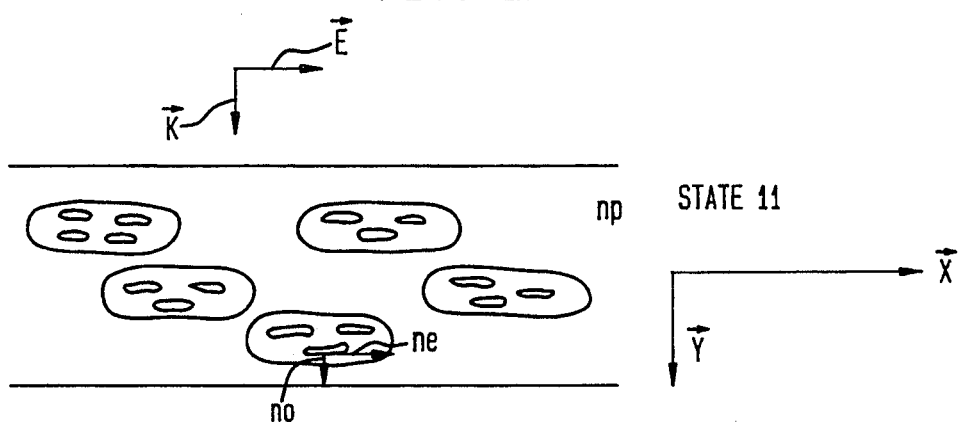
FIG. 2a shows this type of film generating a transparent state 11
Figure 2B:
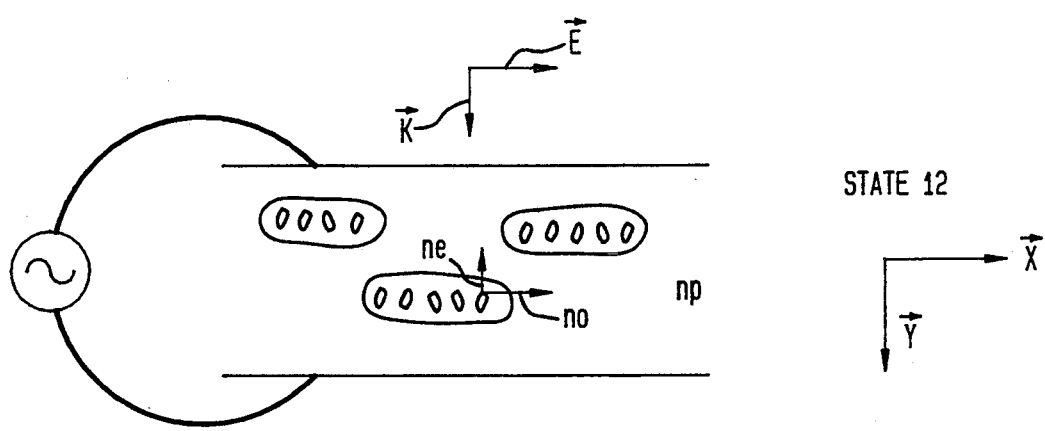
FIG. 2b shows the same film generating a diffusing state 12 under an electric field

The diffusing display screen according to the invention may advantageously consist of a cell ($C_1$) comprising a polymer material (P) which may be of the polyvinyl alcohol type or of the epoxy resin type, in which are dispersed balls of liquid crystal, preferably nematic liquid crystal. Several techniques allow composite films of this nature to be obtained. The synthesis of the PDLC polymer may be performed by producing a latex of liquid crystal particles encapsulated by a ring of polymer, the coating of a substrate with this type of solution followed by the evaporation of the solvent, generates a film of polymer with dispersed liquid crystal. It is also possible to use a liquid crystal in the fluid state, a liquid monomer, to mix these together, to deposit this mixture on a substrate, then to initiate the polymerisation thermally or by ultra-violet radiation, the polymer and the liquid crystal segregating and leading to a film of PDLC being obtained. It is also possible to mix, when hot, a polymer in the solid state directly with a liquid crystal, to perform, when hot, the coating of a substrate, then to cause the segregation of the polymer and of the liquid crystal by cooling. Another possibility consists in finding a solvent common to the liquid crystal and to the polymer, to produce the coating or the substrate from this solution, the subsequent evaporation of the solvent then leading to the phase separation and to the formation of the film of PDLC. Studies have shown that control of the diffusion and backscattering lobes is ensured by the size distribution of the liquid crystal balls and the thickness of the film (S. Zumer, J. W. Doane Phys. Rev. A. 34, 4, 1986 p. 3373). Typically, the size of the balls may be of the order of a few microns, for a polymer fill of a few tens of microns.

In order to produce a cell ($C_1$) which can be controlled electrically, the film of material ($M_1$) is placed between two transparent electrodes which can be glass plates covered with indium tin oxide.

The cell ($C_1$) is associated with a cell ($C_2$) comprising a material ($M_2$) capable of passing from a transparent state 21 to an absorbing and reflecting state 22. When the material ($M_2$) employed is an electrochromic material ($E_c$), it is necessary to couple it with an electrolyte material (Et). In fact, an electrochromic material can become more absorbing by insertion of cations such as the oxides $WO_3$, $V_2O_5$ or $Nb_2O_5$, or alternatively $TiO_2$.

It can also be coloured by the insertion of anions such as the oxide $I_rO_2$, or alternatively be coloured by deinsertion of ions such as protonated nickel oxide $NiO_2$, $H^+$. In all cases, the exchange of ions is ensured by the presence of a layer of electrolyte material in contact with the layer of electrochromic material. The electrolyte employed may be an organic complex formed of polymers of the polyether type, and of salts of alkali metals. The cell $C_2$ may thus be composed of two glass plates (or any other transparent substrate such as flexible polymer films) on which are deposited transparent electrodes ($F_2$) which can be layers of indium tin oxide. Between these electrodes are inserted at least one layer of electrochromic material ($E_c$) and one layer of the electrolyte (Et).

Figure 3:
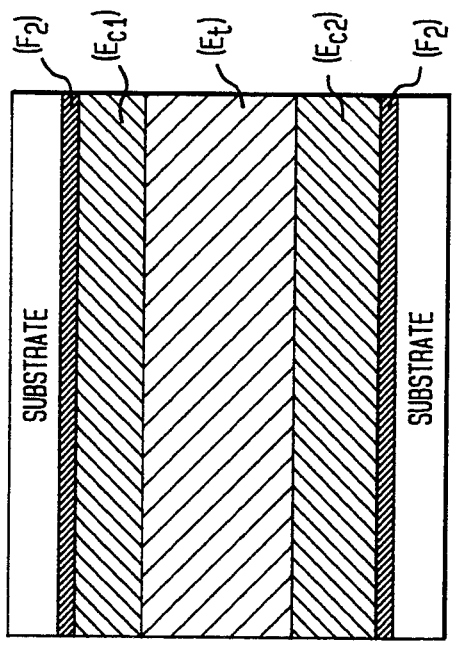
FIG. 3 illustrates an example of cell ($C_2$) used in a diffusing display screen according to the invention.

FIG. 3 illustrates one embodiment of a cell ($C_2$) comprising two layers of electrochromic materials ($Ec_1$) and ($Ec_2$) separated by a layer of electrolyte (Et). The material ($Ec_1$) may be an electrochromic material capable of being coloured by reversible insertion of cations, the material ($Ec_2$) may be an electrochromic material capable of being coloured, and therefore of absorbing, by insertion of anions, and the electrolyte is then in this case capable of providing cations and anions under the action of a voltage. More precisely, it may involve the combination of a layer of tungsten oxide $WO_3$ (material $Ec_1$); it being possible for the electrolyte (Et) to be propylene carbonate loaded with lithium perchlorate (ions $Li^+$ and $ClO_4^-$). The advantage of two layers is twofold, and resides in the insulation of the reactive layer of electrolyte (Et) from an electrode ($F_2$) so as to avoid the degradation thereof, and to reinforce the variations in absorption of the electrochromic cell ($C_2$).

Figure 4:
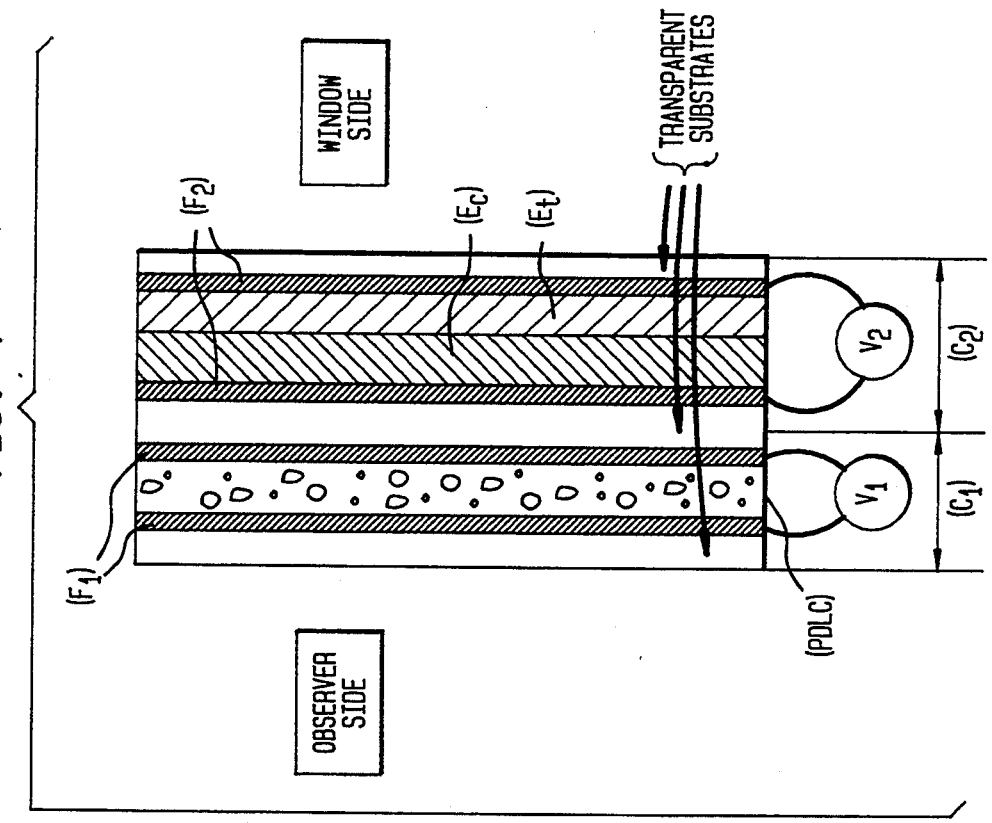
FIG. 4 illustrates an example of a diffusing display screen according to the invention constituted by the combination of a cell ($C_1$) comprising a polymer with dispersed liquid crystal, and of a cell ($C_2$) comprising an electrochromic material.

The combination of a cell ($C_1$) with a cell ($C_2$) is illustrated in an example of a diffusing display screen for image projection. FIG. 4 diagrammatically represents both cells ($C_1$) and ($C_2$). The cell ($C_1$) is supplied with a voltage $V_1$ allowing the diffusing state to be maintained during the operation of the display screen in the case of a polymer with dispersed nematic which does not have a memory effect. The cell ($C_2$) is supplied with a voltage $V_2$ making it possible, in the case of an electrochromic cell, to switch from a transparent state 21 to an absorbing state 22, such a cell furthermore has the advantage of being with memory effect, it is therefore not necessary to maintain the voltage $V_2$ during the operation of the display screen; when it is desired to return to the transparent state 21, it is then sufficient to apply a voltage $-V_2$ in order to obtain reverse ion exchange leading to the decolouration of the cell ($C_2$).

Typically, in order to produce a display screen of surface area 1 $m^2$, it is possible to use:
 a cell ($C_1$) comprising a layer of PDLC material of 20 microns thickness, the size of the liquid crystal microballs being of the order of 2 to 3 microns, the dielectric properties of the PDLC materials are conventionally:
  resistivity $10^8$ ohm-m
  equivalent capacitance C=2.2 microF which implies a voltage for switching to the diffusing state of 40 V at 2 kHz, a switching time of approximately 10 ms, the efficiency of the PDLC material in backscattering Rd being greater than 20%
 a cell ($C_2$) comprising at least one layer of electrochromic material, one layer of electrolyte. Typically, the control voltages are of the order of a few tens of volts, depending on the materials employed.

The switching times vary from one to a few tens of seconds depending on the control voltages.

For tungsten oxide, the transmission factor Tec in the blocking state is of the order of 0.1, and the reflection coefficient Rec averaged over the whole visible spectrum in the blocking state is greater than 0.25.

It is thus possible to evaluate, as a first approximation, the reflectivity Re of the screen, and its transparence T.

$$R_e = R_d + (1-R_d)(1-R_d) Rec = 0.36$$

$$T = (1-Rec) Tec (1-Rd) = 0.06$$

When this screen is juxtaposed on a surface (S) of the window type, it is possible to evaluate the level of parasitic light brought by the display screen into the surrounding light. Typically, in a sunny room, the background lighting Ea may be of the order of 500 lux.

The parasitic luminence transmitted by the display screen is then $L_t = T.E_a/\pi = 10$ nits.

The mean luminence of the surroundings $L_{env}$ is defined by $L_{env} = R_{env}.E_a/\pi = 29$ nits by using the usual value of photographs relating to the reflectivity of the surroundings Renv=0.18.

The parasitic luminence reflected by the surroundings $L_r$ is defined by $L_r = Re.L_{env} = 10$ nits, which leads to a total parasitic luminence of the display screen $Lp = L_r + L_t = 20$ nits.

This total parasitic luminence of the display screen remains less than the mean luminence of the surroundings in the unfavourable case of high background lighting.

We claim:

1. A diffusing display screen comprising a combination of
    a cell (C$_1$) which comprises a polymer film (P) having an optical index np, in which are dispersed microballs which are oblong in shape, the larger axis thereof being laid out in parallel to the plane of the film, wherein said microballs contain oblong and birefringent liquid crystal molecules of extraordinary index n$_e$ such that n$_e$ is equal to n$_p$, and
    a cell (C$_2$) which comprises a layer of electrochromic material (E$_c$), and transparent electrodes (F$_2$) which allow a voltage to be applied to said cell (C$_2$) so as to switch said cell (C$_2$) from a transparent state to an absorbing and reflecting state, wherein both of said cells (C$_1$) and (C$_2$) being fixed onto a surface,
    wherein said diffusing display screen is for use with a standard image projector and operates in a reflection mode which allows reflection of images whose size may be variable.

2. The diffusing screen of claim 1, wherein said surface is a window.

3. The diffusing screen of claim 1, wherein said surface is a wall.

* * * * *